United States Patent
Ho (12)

(10) Patent No.: US 6,477,659 B1
(45) Date of Patent: Nov. 5, 2002

(54) MEASURING TIMING MARGINS IN DIGITAL SYSTEMS BY VARYING A PROGRAMMABLE CLOCK SKEW

(75) Inventor: Stephen Ho, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/389,726

(22) Filed: Sep. 3, 1999

(51) Int. Cl.[7] .............................. G06F 1/04; G06F 1/24
(52) U.S. Cl. ....................................... 713/503; 713/501
(58) Field of Search ................................ 713/501, 503; 324/617; 714/700, 745

(56) References Cited

U.S. PATENT DOCUMENTS

| | | | | |
|---|---|---|---|---|
| 4,564,943 A | * | 1/1986 | Collins et al. | 714/745 |
| 4,882,738 A | * | 11/1989 | Suzuki | 375/357 |
| 5,231,599 A | * | 7/1993 | Vlahos | 714/700 |
| 5,291,141 A | * | 3/1994 | Farwell et al. | 324/617 |
| 5,396,183 A | * | 3/1995 | Farwell et al. | 324/617 |
| 5,455,931 A | * | 10/1995 | Camporese et al. | 713/501 |
| 5,740,067 A | * | 4/1998 | Hathaway | 364/489 |
| 5,852,640 A | * | 12/1998 | Kliza et al. | 375/356 |
| 6,327,274 B1 | * | 12/2001 | Ravikanth | 370/516 |

FOREIGN PATENT DOCUMENTS

| JP | 404107713 A | * | 4/1992 |

* cited by examiner

Primary Examiner—Thomas Lee
Assistant Examiner—Chun Cao
(74) Attorney, Agent, or Firm—Park, Vaughn & Fleming LLP

(57) ABSTRACT

A system that measures timing margins within a digital system by varying a clock skew between components in the digital system. The system receives a reference clock signal as an input. This reference clock signal is used to generate a first clock signal and a second clock signal so that there exists a programmable skew between the first clock signal and the second clock signal. The first clock signal is used to drive a first component, and the second clock signal is used to drive a second component in the digital system. The system measures an upper margin for the clock skew by iteratively increasing the clock skew and testing the system to verify that it operates correctly. When the digital system stops operating correctly, the upper margin is set to be the amount by which the clock skew was increased before the digital system stopped operating correctly. The system can also measure a lower margin for the clock skew by iteratively decreasing the clock skew and testing the system to verify that it operates correctly. When the digital system ultimately stops operating correctly, the lower margin is set to be the amount by which the clock skew was decreased before the digital system stopped operating correctly.

17 Claims, 3 Drawing Sheets

MEASURING TIMING MARGINS IN DIGITAL SYSTEMS BY VARYING A PROGRAMMABLE CLOCK SKEW

BACKGROUND

1. Field of the Invention

The present invention relates to testing of digital systems. More specifically, the present invention relates to a method and an apparatus for measuring timing margins within a digital system by varying a programmable clock skew between components in the digital system.

2. Related Art

As computer system clock speeds continue to increase at an exponential rate, the timing margins for signals passing between computer system components are becoming progressively smaller. This makes computer systems increasingly sensitive to variations in the propagation delay in the signals passing between computer system components. These variations can be caused by a number of factors, including changes in operating parameters, such as temperature and voltage. These variations can also be caused by slight variations in the computer system components that are collectively assembled into a computer system. For example, if the computer system components are located on the same semiconductor chip, variations during the semiconductor manufacturing process can cause variations in propagation delay through the individual computer system components.

If the propagation delay for a signal falls outside of a safe range, the signal may arrive too early or too late at a given computer system component. This can cause the wrong value to be stored in a memory element, which can cause the computer system to produce an erroneous result.

Computer systems can be tested in a number of ways to determine whether or not they will operate properly. A computer system can be tested at different clock speeds. For example, the clock speed can be increased until the computer system stops operating correctly. The computer system is then certified to operate at a clock speed that is lower than this maximum possible value. The problem with this type of testing is that many critical timing paths are not clock dependent. Hence, timing margins on these critical timing paths cannot be measured by varying the clock speed.

Alternatively, a computer system can be tested in different operating environments by varying parameters such as voltage and temperature. Unfortunately, this type of testing cannot measure timing margins, because timing parameters of interdependent components will often change together in a complementary way as voltage and/or temperate change.

To ensure that computer system components will continue to operate properly in different system configurations and operating environments, it is necessary to accurately measure timing margins. Simply knowing that the device operates properly in a given environment or configuration is not sufficient. Even if a device operates properly, a timing margin for a critical signal can be extremely narrow. If this is the case, a small variation in the propagation delay of the critical signal causes the timing margin to be exceeded, and can thereby cause the system to fail.

Automatic testing equipment (ATE) systems are often used to measure timing margins on critical paths through devices within a computer system. However, ATE systems are limited to measuring timing between signals as they appear on the I/O pins of a semiconductor chip, or on the interface pins on a circuit module. Hence, ATE systems are not capable of measuring timing margins between internal functional blocks within a chip or within a circuit module.

Another alternative is to use simulation software to simulate timing margins between components within a semiconductor chip before the chip is fabricated. However, simulation programs run extremely slowly, typically many thousands and possibly millions of times slower than the circuitry that is being simulated. Hence, only a limited number of test cases can be simulated. Furthermore, the models used for simulations are not entirely accurate, and simulations do not accurately account for process variations during manufacture of the semiconductor chip, which can affect propagation delays.

What is needed is a method and an apparatus for measuring timing margins along critical signal paths between components within a digital system.

SUMMARY

One embodiment of the present invention provides a system that measures timing margins within a digital system by varying a clock skew between components in the digital system. The system receives a reference clock signal as an input. This reference clock signal is used to generate a first clock signal and a second clock signal so that there exists a programmable skew between the first clock signal and the second clock signal. The first clock signal is used to drive a first component, and the second clock signal is used to drive a second component in the digital system. The system measures an upper margin for the clock skew by iteratively increasing the clock skew and testing the system to verify that it operates correctly. When the digital system stops operating correctly, the upper margin is set to be the amount by which the clock skew was increased before the digital system stopped operating correctly.

In one embodiment of the present invention, the system measures a lower margin for the clock skew by iteratively decreasing the clock skew and testing the system to verify that it operates correctly. When the digital system ultimately stops operating correctly, the lower margin is set to be the amount by which the clock skew was decreased before the digital system stopped operating correctly.

In a variation on the above embodiment, the system uses the upper margin and the lower margin to compute a substantially optimum clock skew value, and then sets the clock skew to the substantially optimum clock skew value for subsequent operation of the digital system.

In another variation on the above embodiment, the system computes a function of the upper margin and the lower margin of the clock skew to determine if the digital system has acceptable timing margins.

In one embodiment of the present invention, the system generates the first clock signal by adding a first delay to the reference clock signal. The system correspondingly generates the second clock signal by adding a second delay to the reference clock signal.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
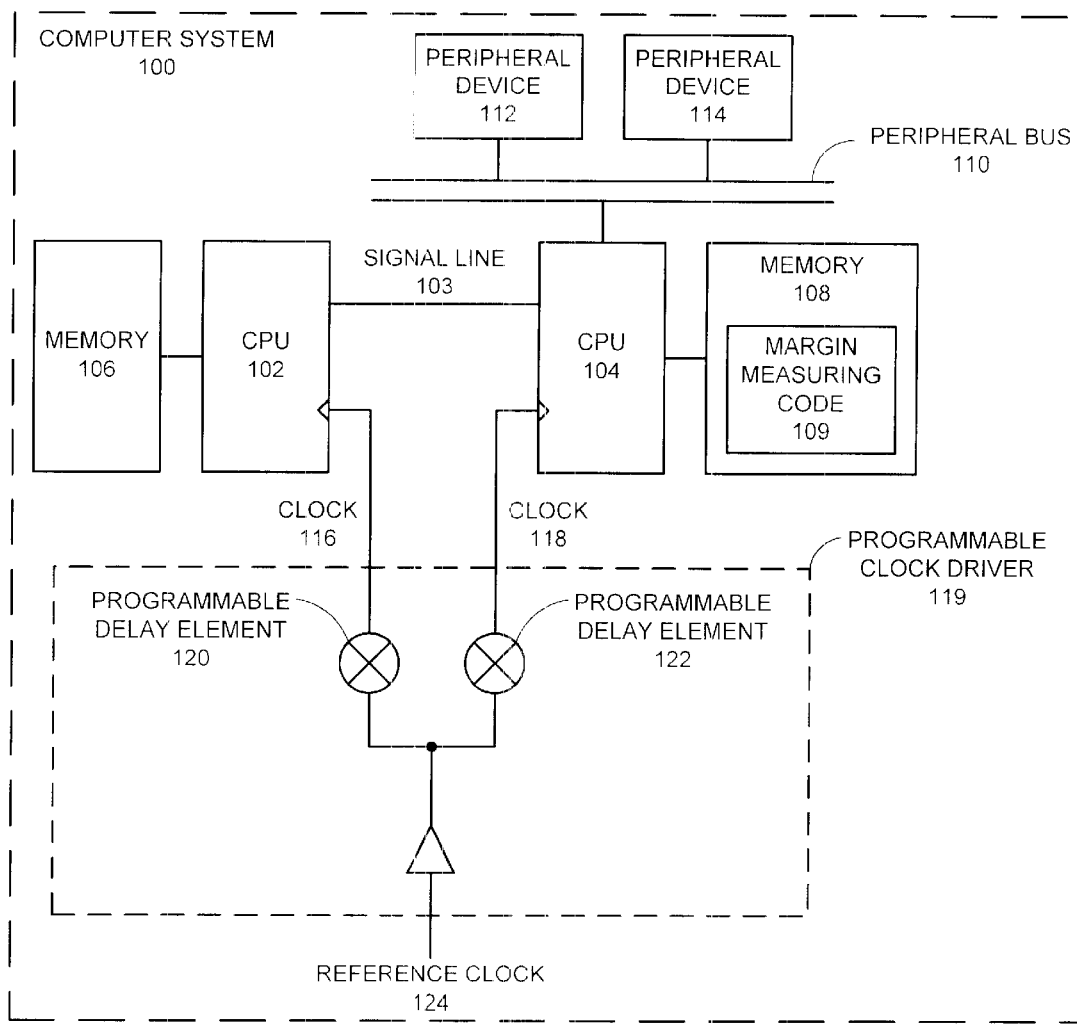
FIG. 1 illustrates a computer system including programmable delay elements in ac t with an embodiment of the present invention.

FIG. 1 illustrates a computer system 100 including programmable delay elements 120 and 122 in accordance with an embodiment of the present invention. Computer system 100 includes central processing unit (CPU) 102, which is coupled to CPU 104 through signal line 103. CPUs 102 and 104 can include any type of computational engine for a computer system, including but not limited to, microprocessors, main frame processors, device controllers and computational engines within appliances. Signal line 103 can include any type of channel for transmitting signals between CPU 102 and CPU 104. This includes channels capable of transmitting electrical, infrared, radio frequency and optical signals. CPU 102 is coupled to memory 106 and CPU 104 is coupled to memory 108. Memories 106 and 108 can include any type of memory for storing code and/or data for use by CPUs 102 and 104, respectively. Memory 108 contains margin a measuring code 109, which controls the actions of computer system 100 in Be measuring timing margins between functional units within computer system 100.

Note that the terms functional unit, subsystem, node, module and device are used interchangeably within this specification to refer to portions of a computer system between which timing margins are measured. A functional unit can be as small as a subsection of a semiconductor chip that contains a small number of gates, or can be as large as circuit module that contains a number of semiconductor chips. In the embodiment of the present invention illustrated in FIG. 1, the functional units include CPUs 102 and 104.

CPU 104 is coupled to peripheral bus 110. Peripheral bus 110 can include any type of communication channel that enables CPU 104 to communicate with peripheral devices. In the embodiment illustrated in FIG. 1, peripheral bus is coupled to peripheral devices 112 and 114. Peripheral devices 112 and 114 can include any type of peripheral device that can be integrated into a computer system. This includes, but is not limited to, a disk drive, a keyboard, a mouse, a sound card, a display controller, a graphics controller and a network interface controller (NIC).

CPU 102 is coupled to clock signal 116 and CPU 104 is coupled to clock signal 118. Clock signals 116 and 118 are produced by programmable clock driver 119.

In order to produce clock signals 116 and 118, programmable clock driver 119 starts by receiving reference clock signal 124. Note that reference clock signal 124 can be produced from within programmable clock driver 119 or can be received from an external source. Reference clock signal 124 passes through programmable delay elements 120 and 122 to produce clock signals 116 and 118, respectively. Programmable delay elements 120 and 122 can include any type of delay elements that can be programmed by CPU 104 to vary the delay between reference clock signal 124 and clock signals 116 and 118, respectively. This enables the skew between clock signals 116 and 118 to be varied under program control.

Note that the CPU 104 can communicate with programmable clock driver 119 in a number of ways, including through peripheral bus 110, or alternatively through a serial bus, such as an 12C bus. This enables CPU 104 to program delay elements 120 and 122 in order to measure timing margins in accordance with an embodiment of the present invention.

During a timing margin measuring operation, computer system 100 operates generally as follows. Computer system 100 varies a clock skew between clock signals 116 and 118 while testing computer system 100. This clock skew is increased until the computer system fails, which establishes an upper margin for the clock skew. Next, the clock skew is reset to its starting value and is then decreased until the computer system fails, which establishes a lower margin for the clock skew.

Note that although FIG. 1 illustrates a system for measuring timing margins between CPUs, in general the present invention can be applied to measuring timing margins between any type of functional units within any type of digital system, including between functional units within the same semiconductor chip or between functional units on different circuit boards or on different aggregations of circuit boards.

Semiconductor Chip

Figure 2:
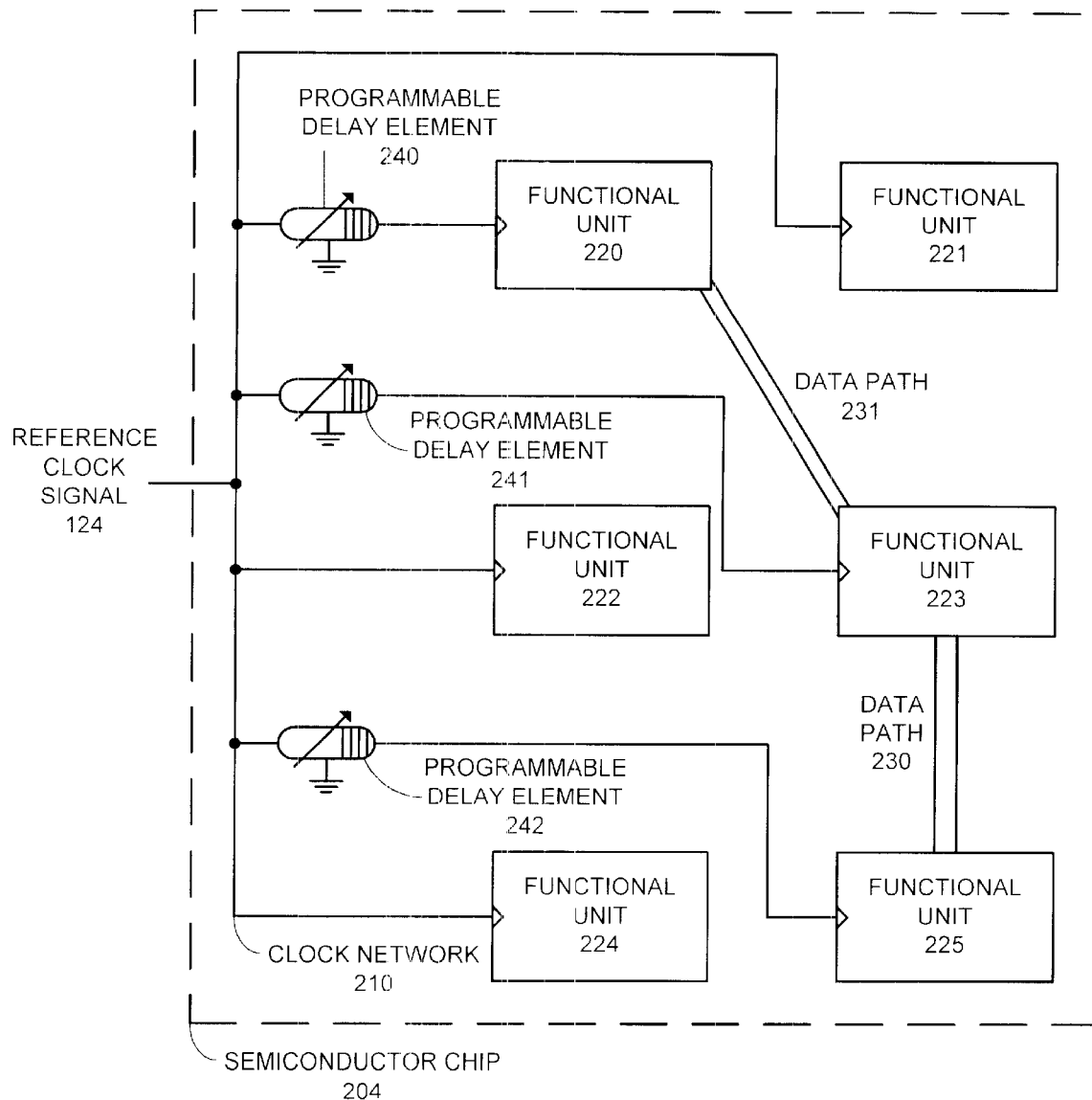
FIG. 2 illustrates a semiconductor chip including programmable delay elements within its clocking network in accordance with an embodiment of the present invention.

FIG. 2 illustrates a semiconductor chip including programmable delay elements within its clocking network in accordance with an embodiment of the present invention. In this embodiment, the programmable delay elements 240–242 reside within semiconductor chip 204 instead of being external to semiconductor chip 204 as is illustrated in FIG. 1. This allows timing margins between r functional units within semiconductor chip 204 to be tested. More specifically, programmable delay elements 240–242 reside within clock network 210. Clock network 210 includes a collection of circuitry that takes as input a reference clock signal 124 and propagates reference clock signal 124 to clock inputs of various functional units within semiconductor chip 204, including functional units 220–225. Functional units 220–225 can include any subsets of circuitry within semiconductor chip 204 that receive clock signal inputs.

Note that any type of programmable delay elements can be used to implement programmable delay elements 240–242. In one embodiment of the present invention, programmable delay elements 240–242 are implemented using drivers with programmable quiescent current.

Also note that programmable delay elements 240–242 are inserted into the clock lines of only a subset (220, 223 and 225) of functional units 220–225 within semiconductor chip 204. This allows timing margins to be measured along critical paths through functional units 220, 223 and 225. More specifically, programmable delay elements 240, 241 and 241 are inserted into clock lines going to functional units 220, 223 and 225, respectively. Note that functional units 220 and 223 are coupled together through data path 231, and functional units 223 and 225 are coupled together through data path 230. In the example illustrated in FIG. 2, a critical timing path passes through functional units 220, data path 231, functional unit 223, data path 230 and functional unit 225.

During operation, programmable delay elements 240–242 can be varied to change the skew along data paths 230 and 231. In this way, the timing margins for signals between functional units 220, 223 and 225 can be measured.

Process of Measuring Timing Margins

Figure 3:
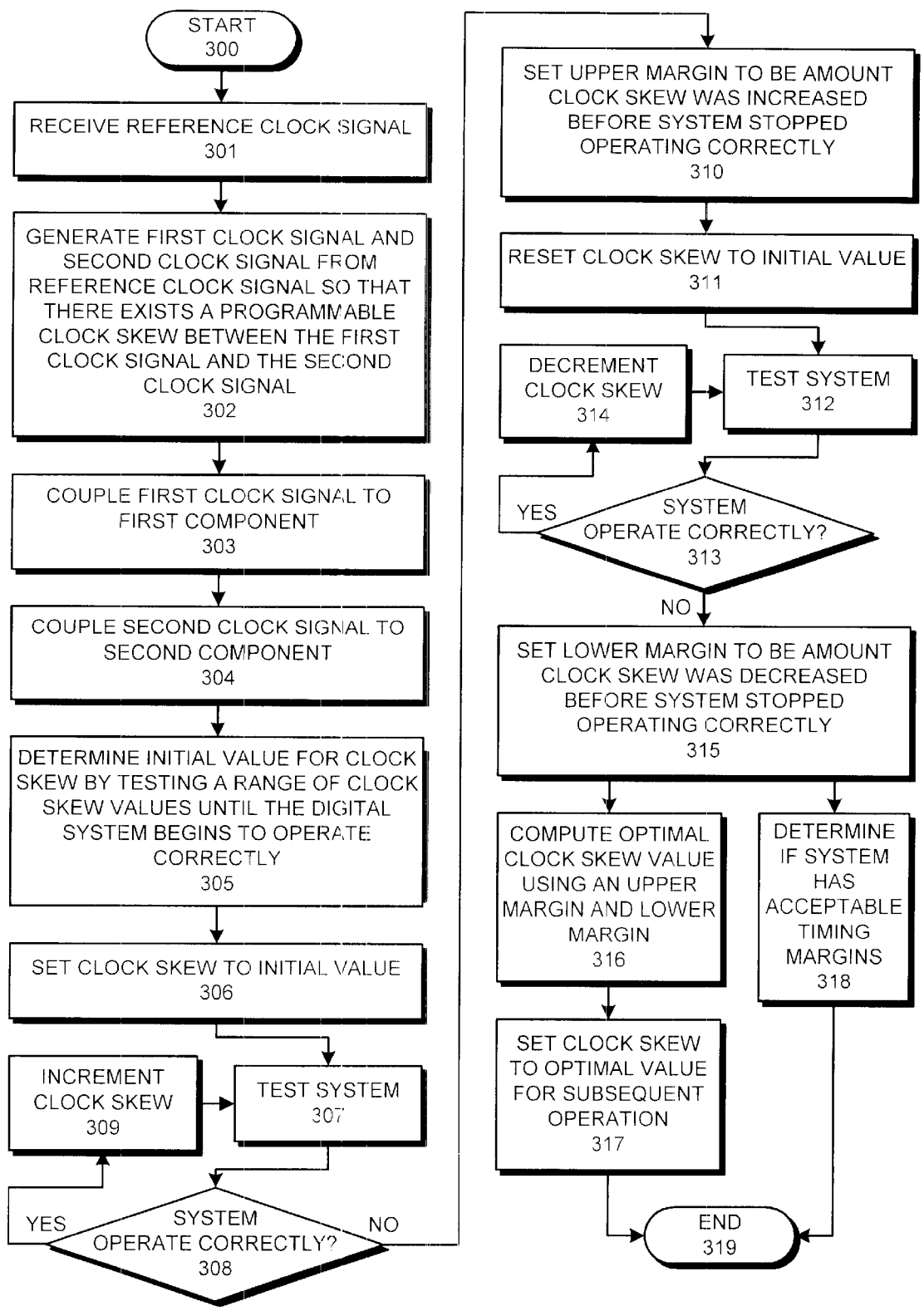
FIG. 3 is a flow chart illustrating the process of measuring timing margins using programmable delay elements in accordance with an embodiment of the present invention.

FIG. 3 is a flow chart illustrating the process of measuring timing margins using programmable delay elements in accordance with an embodiment of the present invention. The system starts be receiving a reference clock signal 124 (step 301). Reference clock signal 124 is used to generate a first clock signal and a second clock signal such that there exists a programmable clock skew between the first clock signal and the second clock signal (step 302). In the embodiment of the present invention illustrated in FIG. 1, this is accomplished by passing reference clock signal 124 through programmable delay elements 120 and 122 to produce clock signals 116 and 118, respectively. The clock skew between clock signals 116 and 118 can be increased either by increasing the delay through programmable delay element 122, decreasing the delay through programmable delay element 122, or through a combination of increasing the delay through programmable delay element 120 and decreasing the delay through programmable delay element 122. In the embodiment illustrated in FIG. 2, the timing margin along data path 231 can be measured by varying the skew between functional units 220 and 223. This can be accomplished by varying the delay through programmable delay elements 240 and 241.

The first clock signal is sent to a first component in the computer system (step 303) and the second clock signal is sent to a second component in a computer system (step 304). In FIG. 1, this corresponds to sending clock signal 116 to CPU 102, and sending clock signal 118 to CPU 104. In FIG. 2, this corresponds to sending the output of programmable delay element 240 into functional unit 220 and sending the output of programmable delay element 241 into functional unit 223.

Next, the system determines an initial clock skew value by testing a range of clock skew values until the system begins to operate properly (step 305). This initial clock skew value acts as a starting point from which timing margins can be measured. Note that this testing process assumes that there exists some type of device, such as a JTAG controller (defined within the IEEE 1149.1 standard), that can be used to load different skew values into the system when the computer system (or more generally the digital system) is not operating properly.

In another embodiment of the present invention, the digital system is assumed to operate properly. If not, the digital system does not pass the test. If the digital system operates properly, the digital system is further tested to determine timing margins. If the measured timing margins are acceptable, the system passes the test.

Next, the clock skew is set to its initial value (step 306), and the margin testing commences. The system measures an upper margin for the skew by iteratively testing the system and incrementing the clock skew until the system stops operating correctly (steps 307–309). When the system stops operating correctly, the upper timing margin is set to be the amount by which the clock skew was increased before the system stopped operating correctly (step 310).

The clock skew is then reset to its initial value (step 311) and the lower timing margin is measured. The system measures the lower margin by iteratively testing the system and decrementing the clock skew until the system stops operating correctly (steps 312–314). When the system stops operating correctly, the lower timing margin is set to be the amount by which the clock skew was decreased before the system stopped operating correctly (step 315).

Next, the process illustrated in FIG. 3 either sets an optimal skew value or determines whether the timing margins are acceptable. In the first case, the system uses the timing margins to compute an optimal skew value (step 316). For example, the optimal timing skew can be computed to be the skew value that makes the upper timing margin equal to the lower timing margin. Next, the system sets the clock skew to the optimal value for future operation of the system (step 317). Setting the skew the optimal value allows for the best possible upper and lower margins. The disadvantage of this approach is that the system must provide a mechanism to store and/or load the optimal skew value before the system can operate.

Alternatively, if the timing margins are being measured to determine whether the system should be certified as operating within specifications, the measurements are merely performed to determine whether the timing margins fall within an acceptable range. In this case, the upper and lower timing margins are examined to determine whether they are acceptable (step 318). In one embodiment of the present invention, this examination process involves computing a function of the upper and lower timing margins that returns a one value if the margins are acceptable and a zero value if the margins are not acceptable. One possible function looks to see whether the upper timing margin exceeds a minimum value and whether the lower timing margin exceeds a minimum value.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for measuring timing margins within a digital system by varying clock skew between components in the digital system, comprising:

receiving a reference clock signal;

generating a first clock signal and a second clock signal from the reference clock signal so that there exists a first clock skew between the first clock signal and the second clock signal;

sending the first clock signal to a first component in the digital system;

sending the second clock signal to a second component in the digital system;

determining an upper margin for the first clock skew by,
        iteratively increasing the first clock skew and testing the digital system until the digital system stops operating correctly, and
        setting the upper margin to be an amount the first clock skew was increased before the digital system stopped operating correctly;

determining a lower margin for the first clock skew by:
   iteratively decreasing the first clock skew and testing the digital system until the digital system stops operating correctly, and
   setting the lower margin to be an amount the first clock skew was decreased before the digital system stopped operating correctly;
using the upper margin and the lower margin to compute an optimum clock skew value; and
setting the first clock skew to the optimum clock skew value for subsequent operation of the digital system.

2. The method of claim 1, further comprising computing a function of the upper margin and the lower margin for the first clock skew, wherein a result of the function indicates whether the digital system has acceptable timing margins.

3. The method of claim 1, further comprising determining an initial value for the first clock skew by testing a range of first clock skew values until the digital system begins to operate correctly.

4. The method of claim 1, wherein generating the first clock signal and the second clock signal from the reference clock signal comprises:
   generating the first clock signal by adding a first delay to the reference clock signal; and
   generating the second clock signal by adding a second delay to the reference clock signal.

5. The method of claim 4, wherein increasing the first clock skew is accomplished by doing one of,
   increasing the first delay,
   decreasing the second delay, and
   increasing the first delay and decreasing the second delay.

6. The method of claim 1, wherein the step of determining the upper margin for the first clock skew is controlled by a computer program.

7. The method of claim 1, further comprising:
   generating a third clock signal and a fourth clock signal from the reference clock signal so that there exists a second clock skew between the third clock signal and the fourth clock signal;
   sending the third clock signal to a third component in the digital system;
   sending the fourth clock signal to a fourth component in the digital system; and
   determining an upper margin for the second clock skew.

8. The method of claim 1, wherein the first component and the second component are located on the same semiconductor chip.

9. The method of claim 1, wherein the first component and the second component are located on separate circuit boards.

10. The method of claim 1, wherein the digital system includes a computer system.

11. An apparatus that measures timing margins within a digital system by varying clock skew between components in the digital system, comprising:
   an input that receives a reference clock signal;
   a clock signal generation mechanism that is configured to generate a first clock signal and a second clock signal from the reference clock signal so that there exists a first clock skew between the first clock signal and the second clock signal;
   wherein the first clock signal is coupled to a first component in the digital system and the second clock signal is coupled to a second component in the digital system;
   a margin measuring mechanism that is configured to,
      iteratively increase the first clock skew and test the digital system until the digital system stops operating correctly, and
      set an upper margin to be an amount the first clock skew was increased before the digital system stopped operating correctly;
   wherein the margin measuring mechanism is further configured to:
      iteratively decrease the first clock skew and test the digital system until the digital system stops operating correctly; and
      set a lower margin to be an amount the first clock skew was decreased before the digital system stopped operating correctly; and
   a clock skew setting mechanism that is configured to:
      use the upper margin and the lower margin to compute an optimum clock skew value, and to
      set the first clock skew to the optimum clock skew value for subsequent operation of the digital system.

12. The apparatus of claim 11, further comprising a clock skew acceptance mechanism that is configured to compute a function of the upper margin and the lower margin for the first clock skew, wherein a result of the function indicates whether the digital system has acceptable timing margins.

13. The apparatus of claim 11, further comprising a clock skew initialization mechanism that is configured to determine an initial value for the first clock skew by testing a range of clock skew values until the digital system begins to operate correctly.

14. The apparatus of claim 11, wherein the clock signal generation mechanism is configured to:
   generate the first clock signal by adding a first delay to the reference clock signal; and
   generate the second clock signal by adding a second delay to the reference clock signal.

15. The method of claim 1, wherein the margin measuring mechanism is controlled by a computer program.

16. A computer system that measures timing margins within the computer system by varying clock skew between components that make up the computer system, comprising:
   a processor;
   a memory;
   an input that receives a reference clock signal for the computer system;
   a clock signal generation mechanism that is configured to generate a first clock signal and a second clock signal from the reference clock signal so that there exists a first clock skew between the first clock signal and the second clock signal;
   wherein the first clock signal is coupled to a first component in the computer system and the second clock signal is coupled to a second component in the computer system;
   a margin measuring mechanism that is configured to,
      iteratively increase the first clock skew and test the digital system until the digital system stops operating correctly, and
      set an upper margin to be an amount the first clock skew was increased before the computer system stopped operating correctly;
   wherein the margin measuring mechanism is further configured to:
      iteratively increase the first clock skew and test the digital system until the digital system stops operating correctly; and set a lower margin to be an amount the first clock skew was decreased before the computer system stopped operating correctly; and a clock skew setting mechanism that is configured to:
use the upper margin and the lower margin to compute an optimum clock skew value, and to
set the first clock skew to the substantially optimum clock skew value for operation of the digital system.

17. A computer readable storage medium storing instructions that when executed by a computer cause the computer to perform a method for measuring timing margins within a digital system by varying clock skew between components in the digital system, comprising:

receiving a reference clock signal;

generating a first clock signal and a second clock signal from the reference clock signal so that there exists a first clock skew between the first clock signal and the second clock signal;

sending the first clock signal to a first component in the digital system; sending the second clock signal to a second component in the digital system;

determining an upper margin for the first clock skew by,
iteratively increasing the first clock skew and testing the digital system until the digital system stops operating correctly, and
setting the upper margin to be an amount the first clock skew was increased before the digital system stopped operating correctly;

determining a lower margin for the first clock skew by:
iteratively decreasing the first clock skew and testing the digital system until the digital system stops operating correctly, and
setting the lower margin to be an amount the first clock skew was decreased before the digital system stopped operating correctly;

using the upper margin and the lower margin to compute an optimum clock skew value; and setting the first clock skew to the optimum clock skew value for subsequent operation of the digital system.

* * * * *